United States Patent

May et al.

[11] Patent Number: 6,024,070
[45] Date of Patent: Feb. 15, 2000

[54] INDIVIDUAL CYLINDER IDLE SPARK CONTROL

[75] Inventors: Judy M. May; John Fiaschetti, both of Rochester Hills; Gregory E. Stauffer, Novi, all of Mich.

[73] Assignee: Chrysler Corporation, Auburn Hills, Mich.

[21] Appl. No.: 09/144,903

[22] Filed: Sep. 1, 1998

[51] Int. Cl.$^7$ .......................................... F02P 5/00
[52] U.S. Cl. ........................ 123/406.25; 123/436
[58] Field of Search ................... 123/339.1, 406.25, 123/406.24, 436

[56] References Cited

U.S. PATENT DOCUMENTS

| | | |
|---|---|---|
| 3,903,856 | 9/1975 | McDougal et al. . |
| 4,116,173 | 9/1978 | McDougal et al. . |
| 4,257,373 | 3/1981 | McDougal et al. . |
| 4,471,737 | 9/1984 | McDougal et al. . |
| 4,575,758 | 3/1986 | Yagley . |
| 4,602,603 | 7/1986 | Honkanen et al. . |
| 4,718,381 | 1/1988 | McDougal et al. . |
| 4,719,573 | 1/1988 | Kissel et al. . |
| 4,809,662 | 3/1989 | McDougal et al. . |
| 4,821,701 | 4/1989 | Nankee, II et al. . |
| 4,949,691 | 8/1990 | Abe et al. ............................ 123/406.25 |
| 4,993,371 | 2/1991 | McDougal et al. . |
| 5,029,567 | 7/1991 | McDougal et al. . |
| 5,099,811 | 3/1992 | Frantz et al. . |
| 5,113,827 | 5/1992 | Vincent . |
| 5,133,322 | 7/1992 | McDougal et al. . |
| 5,421,191 | 6/1995 | Pyko et al. . |
| 5,437,254 | 8/1995 | Korenaga et al. ................. 123/406.25 |
| 5,701,865 | 12/1997 | Thomas et al. . |

*Primary Examiner*—John Kwon
*Attorney, Agent, or Firm*—Mark P. Calcaterra

[57] ABSTRACT

A method is provided for applying spark corrections calculated on an individual cylinder basis to the total spark advance for the motor vehicle engine to counter torque imbalances and stabilize crankshaft or engine accelerations. According to the invention, crankshaft feedback is used to measure an average acceleration of the crankshaft attributable to each cylinder. Thereafter, individual cylinder spark corrections designed to equalize the accelerations of each of the cylinders are calculated based on the individual cylinder average accelerations. The calculated individual cylinder spark corrections are then applied to the total spark advance. Preferably, an event delay is employed to correct for the phase lag caused by filtering the crankshaft accelerations which aligns the spark corrections with the proper cylinder.

7 Claims, 2 Drawing Sheets

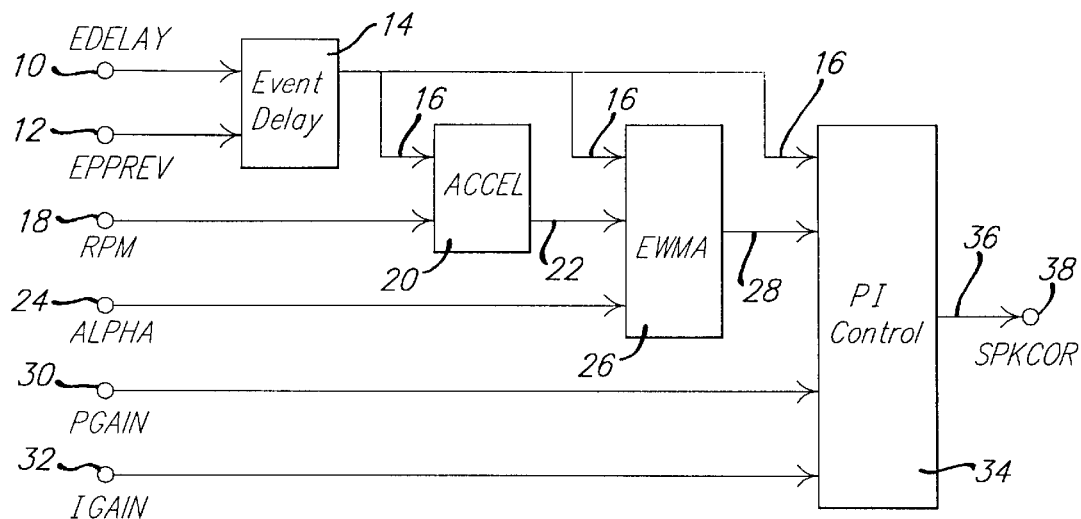
FIG. 1.
| Description | EDELAY | EPPREV | DELEPP |
|---|---|---|---|
| Delay 1 Event | 1 | [0 1 2 3] | [3 0 1 2] |
| Delay 2 Events | 2 | [0 1 2 3] | [2 3 0 1] |
| Delay 3 Events | 3 | [0 1 2 3] | [1 2 3 0] |
FIG. 2.
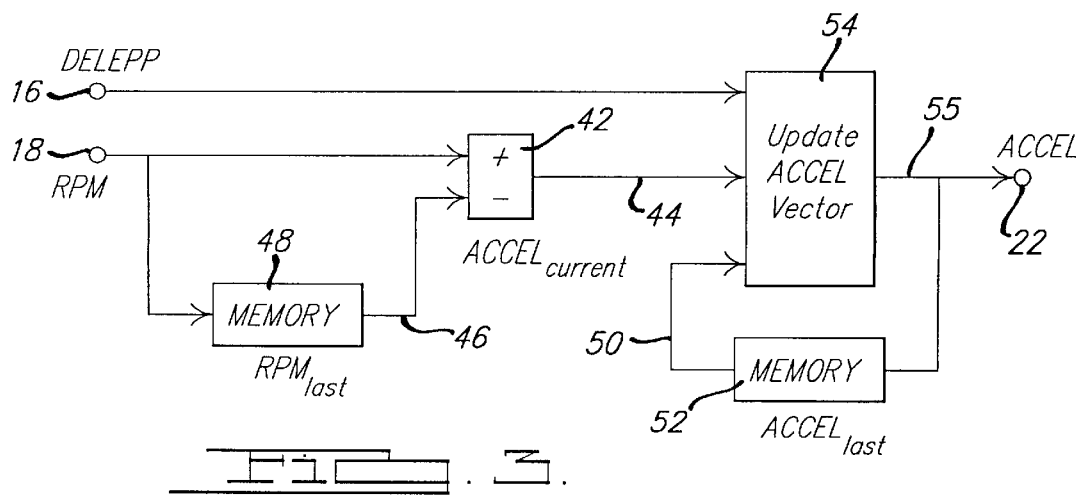
FIG. 3.

6,024,070

INDIVIDUAL CYLINDER IDLE SPARK CONTROL

BACKGROUND OF THE INVENTION

1. Technical Field

The present invention generally relates to idle control for motor vehicles and, more particularly, to a method for improving the idle quality of a motor vehicle engine by applying calculated spark corrections to individual cylinders so as to counter torque imbalances.

2. Discussion

According to the prior art, spark stabilization is used under idle conditions in motor vehicle engines to reduce engine speed excursions away from a desired idle speed set point. Idle spark stabilization works in conjunction with an idle air control motor to maintain a constant idle engine speed and to counteract the effects of varying accessory loads on idle speed.

Idle spark stabilization is a short-term correction utilizing a proportional-derivative controller to act upon any deviation from desired idle speed. If the engine is operating below or above the desired idle speed, the feature advances or retards spark angle for all cylinders simultaneously, temporarily increasing or reducing the torque output of the engine, respectively. The feature improves desired idle speed tracking performance above that which can be achieved with a typical idle air control motor alone.

Although spark stabilization idle control systems are effective for improving idle speed tracking and therefore idle quality, there is room for improvement in the art. More particularly, it would be desirable to improve the idle quality of the motor vehicle engine by applying spark corrections on an individual cylinder basis to counter torque imbalances between cylinders, in addition to the spark stabilization idle control of the prior art.

SUMMARY OF THE INVENTION

Therefore, it is an object of the present invention to counter torque imbalances to improve idle quality.

It is another object of the present invention to use a proportional-integral controller to respond to an exponentially weighted moving average RPM acceleration to improve idle quality.

It is still another object of the present invention to provide a long term correction for idle quality by balancing individual cylinder crankshaft accelerations.

It is yet another object of the present invention to provide different spark corrections for each individual cylinder.

It is still yet another object of the present invention to provide an event delay to correct for phase lag caused by filtering crankshaft accelerations.

It is another object of the present invention to provide reset integral (I) terms so that the average of the I terms are equal to zero to aid in countering torque imbalances.

It is yet another object of the present invention to enable idle quality control only when the engine speed is within a given range of the target idle speed.

The above and other objects are provided by applying spark corrections calculated on an individual cylinder basis to the total spark advance for the motor vehicle engine to counter torque imbalances and stabilize crankshaft or engine accelerations. According to the invention, crankshaft feedback is used to measure an average acceleration of the crankshaft attributable to each cylinder of the engine. Thereafter, individual cylinder spark corrections designed to balance the accelerations of each of the cylinders are calculated based on the individual cylinder average accelerations. The calculated individual cylinder spark corrections are then applied to the total spark advance. An event delay which aligns the spark corrections with the proper cylinder is employed to correct for the phase lag caused by filtering the crankshaft accelerations.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a flow chart illustrating a method of individual cylinder idle spark control according to the present invention;

FIG. 2 is a table depicting the event delay calculation segment of the method of idle spark control of FIG. 1;

FIG. 3 is a flow chart illustrating the acceleration calculation segment of the idle spark control method of FIG. 1;

DETAILED DESCRIPTION OF THE PREFERRED EMBODIMENTS

Figure 4:
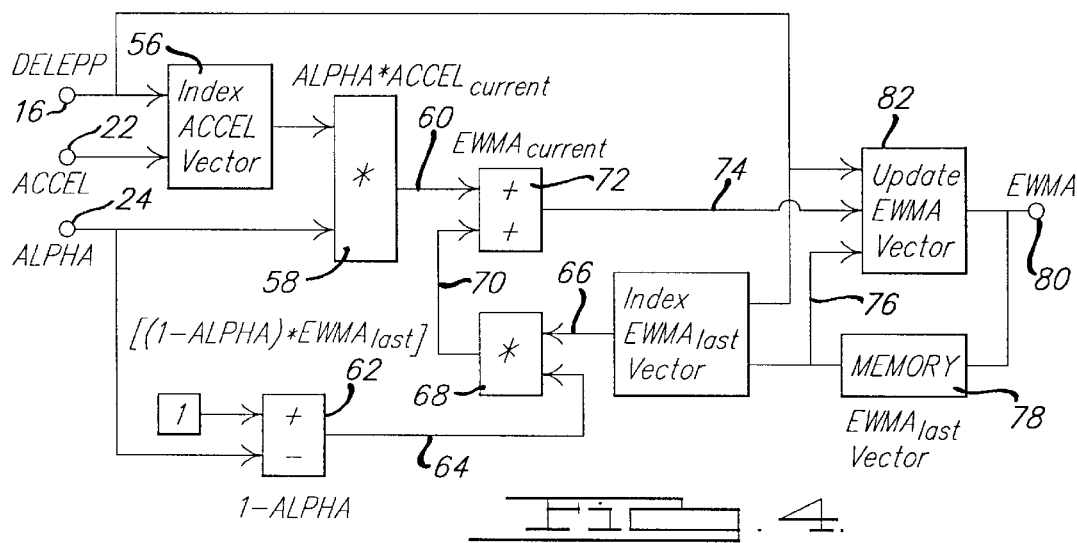
FIG. 4 is a flow chart illustrating the exponentially weighted moving average (EWMA) calculation segment of the method of idle spark control of FIG. 1.

The present invention is directed towards a method of improving idle quality in a motor vehicle by applying individual cylinder spark corrections to counter torque imbalances. According to the present invention, crankshaft feedback is used to measure average accelerations for each cylinder. Individual cylinder spark corrections are then calculated based on the individual cylinder average accelerations. The spark corrections are applied to the total spark advance to balance crankshaft accelerations resulting in improved idle quality.

The present invention is the result of applicant's discovery that over a moving average or a typical rolling average, the acceleration attributable to each cylinder is exponentially related. Therefore, by determining which cylinders are weaker (i.e., causing less acceleration of the crankshaft) and which cylinders are stronger (i.e., causing more acceleration of the crankshaft), and setting the spark advance of the cylinders to correspond to one another by adding some additional advance to those cylinders that are a little weak and retarding those cylinders that are too strong, an average acceleration may be established across all the cylinders. This brings the acceleration value of the crankshaft approximately to zero. In other words, the methodology calculates an offset for each cylinder in order to balance each cylinder against the remaining cylinders. Accordingly, the differences in acceleration from cylinder to cylinder are reduced.

Although not described in detail below, one skilled in the art will appreciate that the present invention employs a control system including a computational device such as a microprocessor or electronic control unit (ECU) which interfaces with several transducers or sensors which monitor various engine parameters such as engine temperature (TMP), engine speed (RPM), engine manifold absolute pressure (MAP), etc. Examples of such control systems may be found in U.S. Pat. No. 4,821,701 to Nankee II, et al. and U.S. Pat. No. 4,602,603 to Honkanen et al., the disclosures of which are incorporated by reference herein. A further example of such a control system as well as a prior art idle speed control system, may be found in U.S. Pat. No. 4,719,573 to Kissel et al., the disclosure of which is also incorporated by reference herein.

Turning now to the drawing figures, FIG. 1 depicts a flow chart illustrating the individual cylinder idle spark control method of the present invention. In FIG. 1, a plurality of input parameters are used in various calculation segments. As described in greater detail below, an event delay calibration constant 10 and a firing cylinder identifier 12 are used in an event delay calculation segment 14. The event delay calculation segment output (DELEPP) 16 is used to match an RPM value 18 with the proper cylinder by updating an acceleration vector 22 within the acceleration calculation segment 20.

The acceleration vector 22 from the acceleration calculation segment 20 is combined at the event DELEPP 16 with a calibration constant alpha 24 in an exponentially weighted moving average (EWMA) calculation segment 26. The EWMA vector 28 from the EWMA calculation segment 26 is combined at the event DELEPP 16 with a proportional gain calibration 30 and an integral gain calibration constant 32 in a proportional/integral (PI) control calculation segment 34. The output 36 of the PI control calculation segment 34 is utilized for setting the spark correction 38 for improving idle quality. The calibration 10, calibration constant alpha 24, proportional calibration constant 30 and integral gain calibration 32 are preferably read from a ROM location while the firing cylinder identifier 12 and RPM value 18 are read from a RAM location.

Turning now to FIG. 2, the event delay calculation segment 14 of the idle spark control method of FIG. 1 will now be described in greater detail. The event delay calculation segment or look-up table 14 delays an individual cylinder firing event 12 (identified by a cylinder identifier EPPREV) by one event, two events, etc. (EDELAY 10) up to the number of cylinders minus one ($N_{cyl}-1$) event (DELEPP 16). The event delay parameter EDELAY 10 is used to select the appropriate length delay to correct for the phase lag caused by filtering the crankshaft accelerations. This aligns the application of the spark corrections calculated below with the proper cylinder such that all cylinders become balanced.

The look-up table of FIG. 2 for determining the delayed cylinder firing event DELEPP 16 can be replaced, if desired, with the following dynamic determination: If:

$$(EPPREV-EDELAY)<0$$

then:

$$DELEPP=EPPREV+(N_{cyl}-EDELAY)$$

otherwise:

$$DELEPP=EPPREV-EDELAY$$

where EPPREV is a cylinder identifier, and EDELAY is an event delay cylinder identifier. EPPREV ranges from 0 to the number of cylinders minus one ($N_{cyl}-1$) in cylinder firing order. For example, for a four cylinder engine with a cylinder firing order of 1-3-4-2, ACCELO, EWMAO, PTERMO, and ITERMO (described below) refer to EPPREV=0 and cylinder No. 1.

As should be obvious from the foregoing, EDELAY 10 is a method for data alignment. EDELAY 10 corrects for the phase lag caused by filtering (averaging) the crankshaft accelerations described below. Accordingly, EDELAY 10 aligns the application of the spark corrections with the proper cylinder. Also, DELEPP 16 is a pointer used to determine what portion of the vectors (described below) to update and what portion of each vector to retrieve for further processing.

Recalling the description of FIG. 1 above, the acceleration calculation segment 20, EWMA calculation segment 26 and PI control calculation segment 34 are performed at the delayed cylinder firing event 16 (DELEPP). Thereafter, the spark corrections 38 are applied at the cylinder firing event 12 (EPPREV).

Referring to FIG. 3, the acceleration calculation segment 20 of the idle spark control method of FIG. 1 will now be described in greater detail. In block 42, the methodology determines a current acceleration value 44 by comparing the current RPM value 18 (which may be measured from a toothed wheel disposed along the crankshaft) with a previously determined RPM value 46 stored in memory 48. That is, current acceleration value 44 is determined as follows:

$$ACCEL_{current}=RPM_{current}-RPM_{last}$$

The current acceleration value 44 replaces the previous acceleration value within the previous acceleration vector 50 stored in memory 52 at the delayed cylinder firing event DELEPP 16 in block 54 which results in an updated acceleration vector 22 (See FIG. 1).

The acceleration vector 22 is a vector with a length equal to the number of cylinders in the engine in which the present invention is employed. For example, the previous acceleration vector 50 in FIG. 3 is updated for a four cylinder engine in the following manner:

If, $$ACCEL_{last} = \begin{bmatrix} ACCEL0_{last} \\ ACCEL1_{last} \\ ACCEL2_{last} \\ ACCEL3_{last} \end{bmatrix}$$

Where $ACCELO_{last}$ to $ACCEL3_{last}$ are the acceleration values for each of the four cylinders 0, 1, 2, and 3, then, the updated acceleration vector 22 is, $$ACCEL = \begin{bmatrix} ACCEL0_{last} \\ ACCEL1_{last} \\ ACCEL2_{last} \\ ACCEL3_{current} \end{bmatrix} \leftarrow DELEPP,$$

where DELEPP is a pointer or index that indexes which cylinder to update within the last acceleration vector 50 stored in memory 52 that results in the updated acceleration vector 22.

Turning to FIG. 4, the EWMA calculation segment 26 of the idle spark control method of FIG. 1 will now be described in greater detail. In block 56, the acceleration vector 22 is applied at the delayed cylinder firing event time DELEPP 16 to index which cylinder's acceleration value to retrieve within the acceleration vector (see calculations below). The indexed acceleration vector 56 is combined with the alpha calibration constant 24 at block 58 to yield output 60. The alpha calibration 24 is subtracted from one at block 62 and the output 64 is combined with a previously indexed EWMA value 66 at block 68. The result 70 is combined with the output 60 of block 58 at block 72 to determine an EWMA current value 74.

The EWMA current value 74 replaces the previous EWMA at the delayed cylinder firing event DELEPP 16 within the EWMA vector 76 from memory 78 to yield an updated EWMA vector 80 at block 82. Also, the previous EWMA vector 76 is only applied to the output 64 of block 62 at the delayed cylinder firing event time DELEPP 16.

The schematic illustration of FIG. 4 can also be described as follows:

$$EWMA_{current}(DELEPP)=ALPHA*ACCEL_{current}(DELEPP)+(1-ALPHA)*EWMA_{last}(DELEPP).$$

As stated above, EWMA is a vector with a length corresponding to the number of cylinders in the engine. As such, the EWMA vector is updated the same way that the ACCEL vector is updated (i.e., with DELEPP used as a pointer or index). For a four cylinder engine, the vectors, ACCEL and EWMA, are indexed in the following manner:

If, $$ACCEL = \begin{bmatrix} ACCEL0 \\ ACCEL1 \\ ACCEL2 \\ ACCEL3 \end{bmatrix} \leftarrow DELEPP,$$

then, $$ACCEL_{current}=ACCEL1.$$

Thus, referring to FIG. 4, the inputs to the index vector block 56 are DELEPP 16 and the acceleration vector 22. The output of the index vector block 56 is the value within the acceleration vector 22 that DELEPP 16 points to. Similarly, referring to FIG. 3, the inputs to the update vector block 54 are DELEPP 16, the current acceleration value 44, and the stored acceleration vector from memory 52 of the previous vector update. The output 22 of the update vector block 54 is an updated acceleration vector 22 in which the current acceleration value at DELEPP replaces the previous acceleration value at DELEPP. Referring again to FIG. 4, the calculations between the index vector block 56 and the update vector block 82 are only performed on one value within the acceleration and EWMA vectors at DELEPP.

Figure 5:
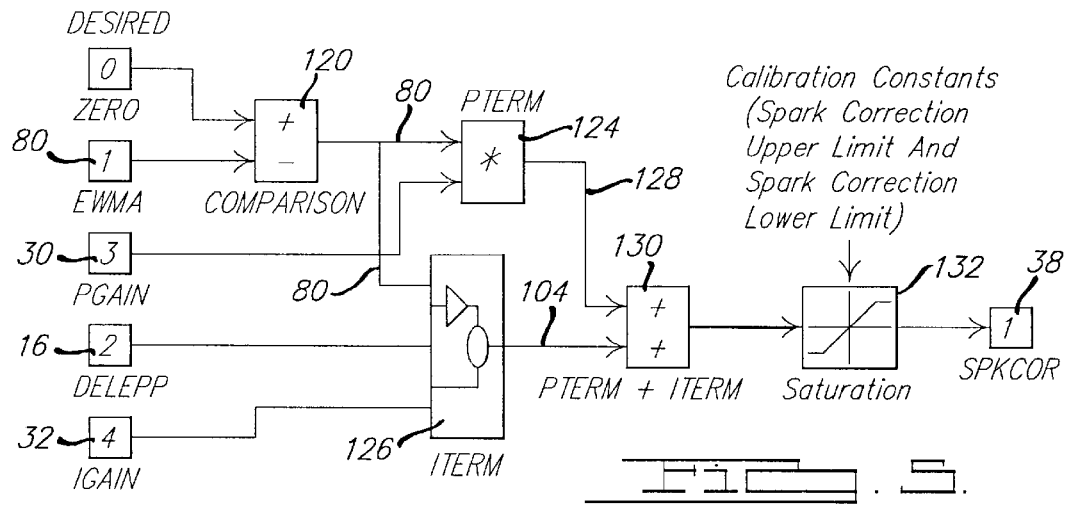
FIG. 5 is a flow chart illustrating the proportional/integral (PI) control calculation segment of the idle spark control method of FIG. 1.

The PI control calculation 34 segment of the P/I control segment of FIG. 1 is illustrated in FIG. 5. The EWMA vector 80 is compared to a desired steady-state value such as zero at comparator 120. The current EWMA vector 80 (which is the error $e_k$ from zero) is then combined with the PGAIN calibration value 30 at block 124 and is combined with the IGAIN calibration value 32 and the event DELEPP 16 in the integral term calculation block 126 to yield the PTERM and ITERM vectors, respectively.

Figure 6:
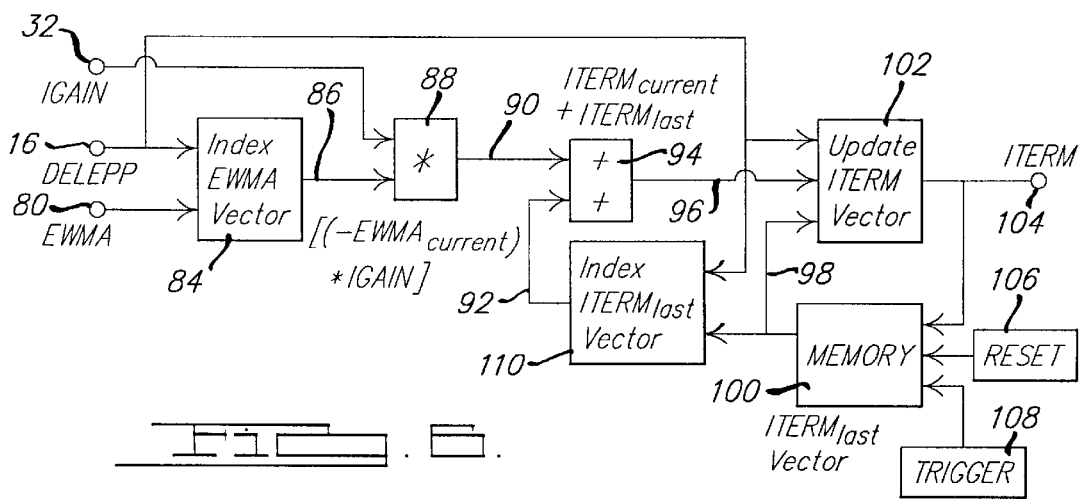
FIG. 6 is a flow chart illustrating the integral term calculation segment of FIG. 5.

Referring momentarily to FIG. 6, the integral term calculation block 126 is shown in greater detail.

Referring now to FIG. 5, an integrator controller is known to drive steady-state error to zero. However, the integrator may also create instability or poor dynamic character such as overshoot and excessive ringing in the output. Therefore, a proportional plus integral controller is utilized in the present invention to reduce the steady-state error to zero while yielding acceptable dynamics. As is known in the relevant art, the proportional term is proportional to the error signal and the integral term is proportional to the integral of the error signal. In FIG. 6, the EWMA vector 80 is indexed (i.e., the current EWMA is retrieved) at block 84 at the delayed cylinder firing event time DELEPP 16. The indexed EWMA term 86 from block 84 is combined with the I gain calibration constant 32 at block 88 to yield an output 90.

The output 90 is combined with a previously determined indexed I term 92 at block 94. The output 96 from block 94 is combined at the delayed cylinder firing event DELEPP 16 with a previous I term vector 98 from memory 100 in order to update the I term vector at block 102 to yield an updated I term vector 104. The determined updated I term vector from block 102 is stored to memory 100. The memory 100 is reset to value 106 (ITERM$_{last}$–AVGTER) when triggered at 108. The stored I term vector is used in block 102 to update the I term vector and also in block 110 to determine a previously indexed I term 92.

Referring again to FIG. 5, the PTERM vector 128 from block 124 is combined with the ITERM vector 104 at block 130 to yield spark correction 38. Spark correction 38 is subject to a saturation comparator 132 including calibration constants which ensures the magnitude of the spark correction 38 is between upper and lower limits. Thereafter, spark correction 38 is applied to the total spark advance at the time EPPREV such that the acceleration from the proper cylinder is changed.

The integral term of the PI controller in continuous time is defined as:

$$ITERM=IGAIN*\int error(t)dt \text{ from 0 to } t.$$

In this case, the error is –EWMA and the PI controller is event based (in discrete time). The integral is approximated with the following trapezoidal integration difference equation:

$$ITERM=0.5*Ki*T*[(e_0+e_1)+\ldots+(e_{k-1}+e_k)]$$

where Ki is the integral gain and T is the sampling rate.

The sampling rate for the individual cylinder spark is T=1 EPP (engine firing event). Substituting IGAIN=0.5*Ki, T=1, and $-EWMA_k=e_k$ into the above equation, $$ITERM =$$
$$-IGAIN*(1)*[(EWMA_0+EWMA_1)+\ldots+(EWMA_{K-1}+EWMA_K)]$$
$$ITERM = IGAIN*-EWMA_K + IGAIN*\Sigma - EWMA_i \text{ from } i =$$
$$0 \text{ to } (k-1)$$
$$ITERM = ITERM_{current} + ITERM_{last}$$

where ITERM$_{current}$=IGAIN*–EWMA$_k$ (located at block 88 in FIG. 6) and ITERM$_{last}$=IGAIN*E–EWMA$_i$ from i=0 to (k-1) (located at 92 (ITERM$_{last}$) and 100 (ITERM$_{lastvector}$) in FIG. 6).

ITERM$_{last}$ is a vector of a summation of the previous ITERMS for each individual cylinder stored in memory 100.

The PI control calculations may also be defined as:
Proportional term:

$$PTERM(I)=-EWMA(I)*PGAIN;$$

Where, for a 4-cylinder engine, $$I = DELEPP,$$

and, $$PTERM = \begin{bmatrix} PTERM0 \\ PTERM1 \\ PTERM2 \\ PTERM3 \end{bmatrix} \text{ and } EWMA = \begin{bmatrix} EWMA0 \\ EWMA1 \\ EWMA2 \\ EWMA3 \end{bmatrix};$$

Integral term:

$$ITERM(I) = -EWMA_{current}(I)*IGAIN + ITERM_{last}(I);$$

Where, $$I = DELEPP,$$

and $$PTERM = \begin{bmatrix} PTERM0 \\ PTERM1 \\ PTERM2 \\ PTERM3 \end{bmatrix} \text{ and } EWMA = \begin{bmatrix} EWMA0 \\ EWMA1 \\ EWMA2 \\ EWMA3 \end{bmatrix}.$$

The $ITERM_{last}$ vector memory is reset when a delay timer is greater than or equal to a pre-selected calibration constant time limit. Preferably, the time limit is set in seconds or engine events. At this time, the $ITERM_{last}$ memory is reset to:

$$ITERM_{last} = ITERM_{last} - AVGTER$$

Where, $AVGTER = (ITERM0 + ITERM1 + \ldots + ITERMN_{cyl})/N_{cyl}$ and $N_{cyl}$ is the number of cylinders.

The ITERMS are reset to drive the average of the ITERMS to zero. The I terms are reset to $ITERM_{last} - AVGTER$ so that the average of the individual cylinder I terms are equal to zero. When the P terms go to zero as the errors go to zero, the I terms are equal to the spark corrections. When the I terms are reset, the average of the individual cylinder spark corrections are equal to zero and the average of the individual cylinder torque equals zero. At this point, the individual cylinder torque is balanced. Resetting the I terms to $ITERM_{last} - AVGTER$ also keeps the spark corrections from wandering to a new set point.

Referring again to FIG. 5, the spark corrections 38 are calculated in the following manner:

$$SPKCOR(J) = PTERM(J) + ITERM(J)$$

where, $$J = EPPREV,$$

and, $$SPKCOR = \begin{bmatrix} SPKCOR0 \\ SPKCOR1 \\ SPKCOR2 \\ SPKCOR3 \end{bmatrix} \leftarrow EPPREV.$$

The spark corrections are applied to the total spark advance and are limited to a spark correction upper limit calibration constant and a spark correction lower limit calibration constant. When the spark corrections are applied, the acceleration imported to the crankshaft by each of the cylinders is essentially the same. As such, torque imbalances are eliminated and improved idle quality is realized. It should be noted that in the PTERM and ITERM equations above, a negative sign is used to drive the EWMA's to zero. The negative sign for the EWMA's comes from the comparison of the desired value to the feedback of the closed loop control system. For example, if $r_k$ is the desired value (zero), and $y_k$ is the actual output values that we want to control (EWMA) and $e_k$ is the error, then:

$$e_k = r_k - y_k$$

$$e_k = 0 = -EWMA_k$$

$$e_k = -EWMA_k.$$

Thus, the present invention improves idle quality in motor vehicle engines by balancing crankshaft accelerations. That is, the spark advance is controlled such that the average of the individual cylinder crankshaft accelerations is equal to zero. The accelerations are balanced by determining an average acceleration for each cylinder and advancing or retarding the total spark advance at a preselected time to correspond with the cylinder needing the advance or retard. As such, each cylinder is balanced against the remaining cylinders to produce improved idle quality.

Those skilled in the art can now appreciate from the foregoing description that the broad teachings of the present invention can be implemented in a variety of forms. For instance, while the preferred embodiment of the present invention employs an exponentially weighted moving average, any average which is a function of engine speed should suffice. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of improving idle quality in an engine comprising:
   measuring an average acceleration of a crankshaft in said engine attributable to each cylinder of said engine;
   calculating individual cylinder spark corrections designed to balance said measured average accelerations for each cylinder; and
   applying the individual cylinder spark corrections to a total spark advance of said engine.

2. The method of claim 1 further comprising aligning said application of said spark corrections with the proper cylinder to correct for phase lag.

3. The method of claim 1 wherein a magnitude of said spark correction is controlled to fall within an upper and lower limit.

4. The method of claim 1 wherein said step of measuring further comprises using a proportional-integral controller to respond to an average crankshaft acceleration within said calculating step.

5. The method of claim 4 wherein said average crankshaft acceleration is an exponentially weighted moving average.

6. The method of claim 1 further comprising enabling said application step when an RPM of said engine is within a given range of a target idle speed.

7. The method of claim 5 wherein integral terms of said proportional-integral controller are reset such that the average of said integral terms equals zero.

* * * * *